Sept. 10, 1968     R. J. HAREN ET AL     3,400,580
METHOD AND APPARATUS FOR TESTING OIL FILTER
CARTRIDGES OR THE LIKE Filed Aug. 10, 1965     2 Sheets-Sheet 1

INVENTORS
Ralph J. Haren
Gerald H. Shaff
BY
Carness, Duckey & Pierce
ATTORNEYS

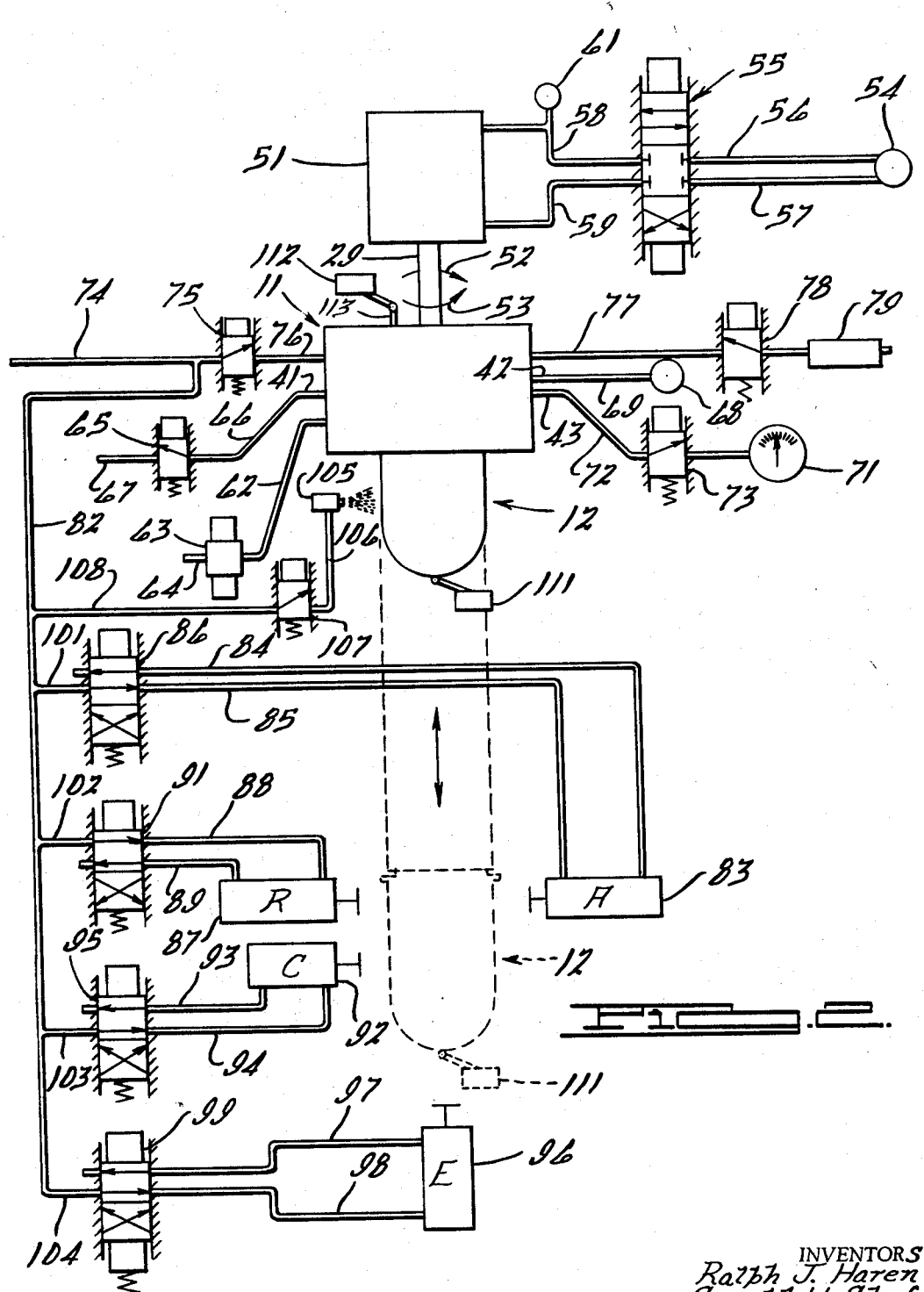

United States Patent Office 3,400,580
Patented Sept. 10, 1968

3,400,580
METHOD AND APPARATUS FOR TESTING OIL FILTER CARTRIDGES OR THE LIKE
Ralph J. Haren and Gerald H. Shaff, Racine, Wis., assignors to Walker Manufacturing Company, a corporation of Delaware
Filed Aug. 10, 1965, Ser. No. 478,620
10 Claims. (Cl. 73—119)

ABSTRACT OF THE DISCLOSURE

A test apparatus and method for checking the threads and determining leakage in the joints of a throw-away type oil filter. The test apparatus includes an inflatable seal for effecting a fluid tight seal in the area of the joint to be tested.

---

This invention relates to a test apparatus and method and more particularly to an apparatus and method for testing the joints between an end plate and housing of an oil filter cartridge or other similar container for leakage.

It is an object of this invention to provide an improved method for leak testing the joint between an end plate and housing of a throw-away type of oil filter cartridge or the like.

It is a further object of this invention to provide an improved apparatus for leak testing the joints between end plates and housings of oil filter cartridges or the like.

It is a still further object of this invention to provide a fully automated apparatus for leak testing oil filter cartridges or the like.

It is another object of this invention to provide an improved leak testing device embodying a new type or seal.

The method of leak testing a joint which comprises this invention includes the step of sealing the joint within a closed chamber surrounding the joint. The interior of the joint is then pressurized and leaks are detected by sensing the pressure within the closed chamber that contains the joint.

Other objects and advantages of this invention will become more apparent as this description proceeds, particularly when considered in conjunction with the accompanying drawings, wherein:

FIGURE 2 is a schematic view showing a test apparatus embodying this invention and including the test head of FIGURE 1.

Figure 1:
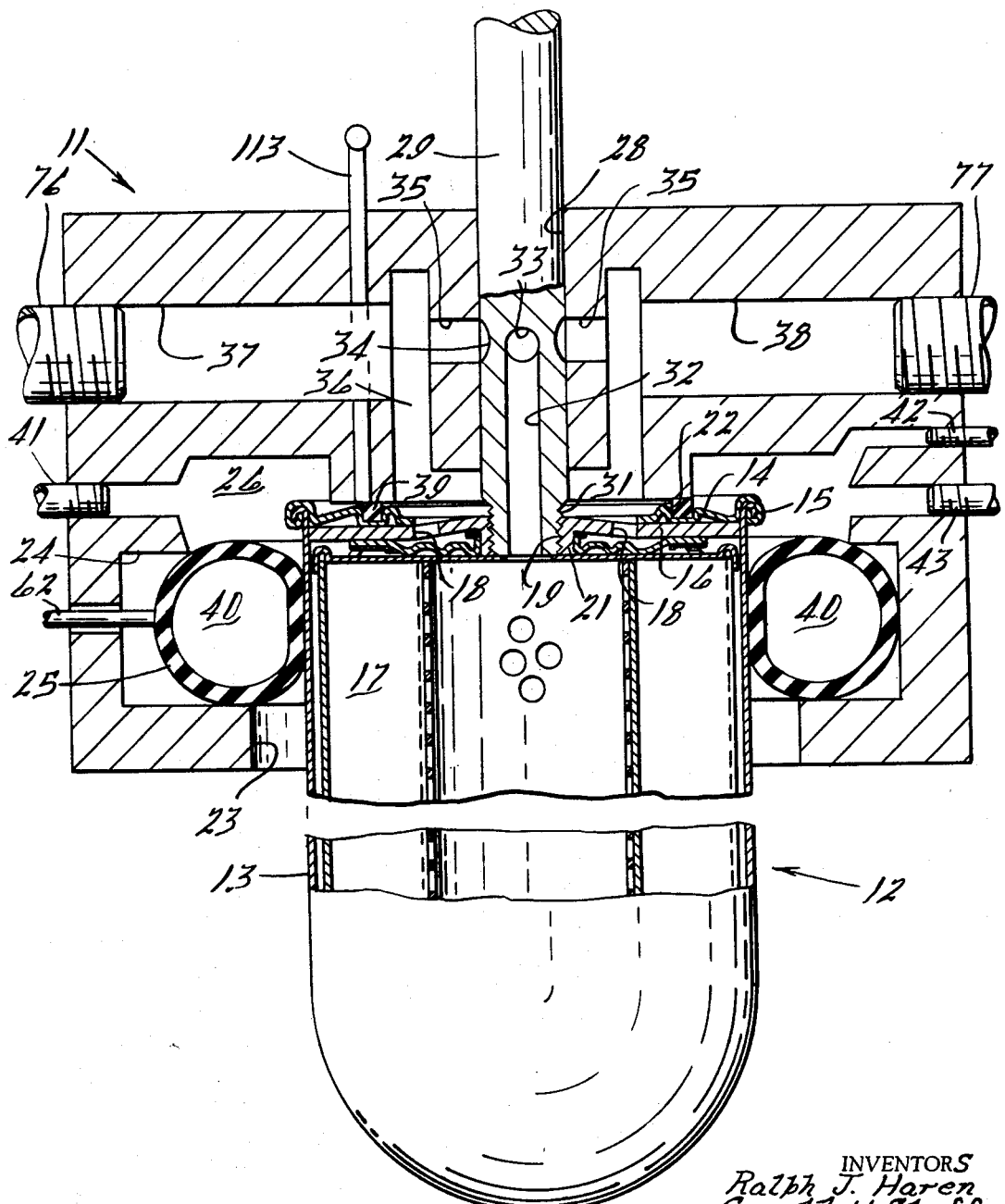
FIGURE 1 is a cross-sectional view of a test head embodying this invention.

Referring now in detail to FIGURE 1, a test head embodying this invention is identified generally by the reference numeral 11. The test head 11 is adapted to test container joints for leakage and is particularly useful in testing the end seals of an oil filter cartridge, identified generally by the reference numeral 12. Although the test apparatus is described for use with the testing of oil filter cartridges, it is to be understood that the apparatus may be utilized to test any type of joint but is particularly advantageous in testing cylindrical jointed containers.

The oil filter cartridge 12 is of the throw-away type and comprises a sheet metal housing 13 having a generally cylindrical shape. One end of the housing 13 terminates at a sheet metal end cap 14 that is joined to the housing 13 by means of a rolled-over lock seam joint 15. A substantially more rigid backing plate 16 is positioned adjacent the end cap 14 around the inner periphery of the housing 13. Contained within the housing 13 is a filter media, indicated generally by the reference numeral 17, of any known type. A plurality of oil inlet passages 18 are formed around the periphery of the end cap 14 and reinforcing plate 16. An oil outlet passage is defined by a female threaded opening 19 formed in an in-turned cylindrical projection 21 of the reinforcing plate 16. The end cap 14 is also formed with an annular groove 22 around the periphery of the oil inlet opening 18 to receive a seal. The filter cartridge 12 will not be described in any further detail since it is to be understood that the construction of the filter cartridge forms no part of this invention. Therefore, the cartridge 12 may be considered to be conventional and may be of any known type.

Referring now specifically to the test head 11, it comprises a generally annular body of metal in which a substantially annular cavity is formed at its lower end. The annular cavity is defined in part by an opening 23 formed in the lower face of the body. The opening 23 terminates adjacent a larger generally annular cavity 24 in which an inflatable annular seal 25 in the form of annular toroidal shape is provided. Another annular cavity 26 is formed in the body of the head 11 above the annular cavity 24. The annular seal 25 is confined within the cavity 24 and when inflated isolates the cavity from the atmosphere for a reason which will become more apparent as this description proceeds.

A cylindrical bore 28 is formed in the upper end of the test head 11 concentrically with the annular cavities 24 and 26 and the opening 23. Rotatably supported within the bore 28 is a shaft 29 having a male threaded lower end 31. The male threads 31 are of the same diameter and pitch as the threads 19 forming the fluid outlet opening of the oil filter cartridge 12, so that the filter cartridge 12 may be threaded onto the lower end of the shaft 29. The shaft 29 is also provided with an axially extending bore 32 that opens through the lower end of the threaded portion 31. The bore 32 terminates at its upper end in one or more transversely extending bores 33 that intersect an annular recess 34 formed around the periphery of the shaft 29.

The annular recess 34 is exposed to two radially extending bores 35 formed in the test head 11 at 180° with respect to each other. The bores 35 terminate at the recess 34 at one end and in an annular cavity 36 at their other end. The lower end of the annular cavity 36 opens into the annular cavity 26 when a filter cartridge 12 is not under test. The cavity 36 is intersected by an air inlet passage 37 at one side of the test head 11 and an air outlet passage 38 at the other side of the test head 11.

A seal 39 is fixed in the annular groove 22 of the filter cartridge 12 prior to its being tested. When a filter cartridge 12 is under test as shown in FIGURE 1, the inflatable annular seal 25 is inflated by pressurizing its hollow interior 40. The housing 13 is thus sealingly engaged around its periphery by the seal 25 and the end cap 14 of the filter cartridge 12 is sealingly engaged by the seal 39. The seals 25 and 39 thus confine the lock seam 15 within the cavity 26 which is also sealed from the atmosphere. Pressure connections 41, 42 and 43 are provided in the test head 11 in communication with the cavity 26 for reasons which will become more apparent as this description proceeds.

Referring now to FIGURE 2 wherein the test apparatus is illustrated schematically, a reversible torque-responsive hydraulic motor 51 has its output shaft coupled to the shaft 29 so that it may be rotated in opposite directions as shown by the arrows 52 and 53. A hydraulic pump 54 is connected to a two-way solenoid control valve 55 by means of pressure conduits 56 and 57. Conduits 58 and 59 interconnect the output side of the solenoid valve 55 with the hydraulic motor 51. A torque-responsive device 61 is positioned in the line 58 so that the motor 51 will cease to be driven at a predetermined torque and reverse for reasons which will become more apparent as this description proceeds.

The interior 40 of the flexible annular seal 25 is connected to a pressure conduit 62 (FIGURE 1) which in turn is connected to a solenoid controlled valve 63 that is fed with air under regulated or controlled pressure less than 90 p.s.i. from a suitable source (not shown) by means of an inlet conduit 64.

The fitting 41 of the cavity 26 is connected to a solenoid controlled valve 65 by means of a conduit 66. The valve 65 is adapted to vent the cavity 26 to the atmosphere through an atmospheric vent line 67. The fitting 42 of the cavity 26 is connected to a pressure sensitive device 68 by means of a conduit 69 so that the pressure sensitive device 68 will be responsive to the air pressure within the chamber 26. In addition, the fitting 43 is connected to a very sensitive very low pressure transducer and indicator gauge 71 by means of a conduit 72 in which a valve 73 is interposed. The valve 73 is provided so that the transducer and gauge 71 will be responsive only when the valve 73 is opened.

A main high pressure air line 74 is provided for the entire test apparatus. Air is delivered to the high pressure line 74 at a constant pressure, preferably 90 p.s.i., from any suitable constant pressure source (not shown). The high pressure line 74 has one branch that is connected to a solenoid operated fill valve 75 that is connected to the passage 37 in the test head 11 by means of a conduit 76 (FIGURE 1). The outlet passage 38 in the test head 11 is connected by means of a conduit 77 (FIGURE 1) to a solenoid operated dump valve 78 that discharges the air from the chamber 36 to the atmosphere through a sound-deadening muffler 79.

A second branch line 82 leads from the high pressure inlet line 74 to a series of control devices, each of which generally consists of a pneumatic cylinder and a solenoid valve for controlling the cylinder. For example, an accept pneumatic cylinder 83 is operated by a pair of pressure lines 84 and 85 that extend to the accept cylinder 83 from a solenoid controlled two-way valve 86. A reject pneumatic cylinder 87 is likewise connected by means of a pair of conduits 88 and 89 to a two-way solenoid controlled valve 91. A clamping cylinder 92 is connected by means of a pair of conduits 93 and 94 to a two-way solenoid controlled valve 95. An elevating cylinder 96 is connected by means of a pair of conduits 97 and 98 to a two-way solenoid controlled valve 99. The solenoid controlled valves 86, 91, 95 and 99 are connected to the high pressure line 82 by means of conduits 101, 102, 103 and 104, respectively.

A spray paint marking device 105 is supplied with air under pressure 106 from a solenoid controlled valve 107 that is also in contact with the high pressure delivery line 82 by means of a conduit 108.

*Operation*

The test device is adapted to be inserted at the end of an automatic assembly line wherein the oil filter cartridges 12 are assembled. The filter cartridges 12 are conveyed from the final assembly operation to the test device by means of any suitable conveyor mechanism (not shown). When a filter cartridge 12 reaches the test station it will engage a limit switch 111 that is positioned at the test station. When the limit switch 111 is closed, the solenoid actuated valve 95 is actuated so that the clamping cylinder 92 will cause the filter cartridge 12 to be engaged, located and held against rotation. The solenoid valve 99 is then actuated so that the pneumatic cylinder 96 elevates the clamped cartridge 12 from the dotted line position to the solid line position shown in FIGURE 2.

During the elevation of the cartridge 12, the expansible seal 25 (FIGURE 1) is deflated so that the lock seam 15 of the filter cartridge 12 may pass through it and enter the cavity 26. When the cartridge 12 is positioned within the test head 11 a limit switch 112 is actuated by means of an actuating rod 113 (FIGURE 1). When this occurs, the hydraulic motor 51 is actuated through operation of the solenoid controlled valve 55 to rotate the shaft 29 and its male threaded end 31 in a proper direction so that the threads 31 engage the threads 19 in the end cap reinforcing plate 16. If the stud 31 is threaded onto the cartridge 12 to a predetermined first level torque setting within a predicted time, the torque responsive device 61 will close the solenoid valve 55 so that the motor 51 is stopped. If the cartridge 12 has an undersize female thread or if a cross threading occurs due to a malformed thread, the first level of torque will not be reached in the predicted time. The torque responsive device 61 then is preconditioned to sense a second, higher torque level, and when this level is reached the solenoid control valve 55 will be actuated to reverse the motor 51 and also actuate the solenoid valve 107. The solenoid valve 107 opens the spray device 105 to line pressure to spray a small amount of paint onto the filter cartridge 12 so that it will be marked as a bad thread reject and thus distinguish it from cartridges that are rejected because of leakage.

At this time, the solenoid controlled valve 75 is opened so that the cavity 36 is exposed to line pressure. The air at line pressure flows into the interior of the filter cartridge housing 13 through the fluid inlet ports 18 and through the passages 35, 34, 33 and 32 into the oil outlet opening 19. Both inlet and outlet passages of the filter cartridge 12 will then be exposed to line pressure.

The expansible seal 25 is then inflated by means of actuation of the solenoid valve 63 so that the seal 25 sealingly engages the housing 13 around its outer periphery. The cavity 26 is then closed and is sealed from the cavity 36 by means of the sealing pressure exerted upon the seal 39 and the action of the expansible seal 25. The solenoid valve 65 which previously had been opened to the atmosphere so that the chamber 26 would be at the same pressure as atmospheric pressure is now closed, to isolate the cavity 26.

Any leakage through the lock seam 15 as a result of the pressurization of the interior of the filter cartridge 12 will raise the pressure within the cavity 26. A pressure above a predetermined pressure, around 10 p.s.i., will actuate the pressure sensitive device 68. If the pressure is not above this pressure which indicates fast leakage of the lock seam 15, the device 68 will not be actuated. The main purpose of the pressure sensing device 68 is to protect the very sensitive very low pressure transducer and indicator gauge 71 by signaling, through control circuitry, that a leak is occurring and is so bad it is not safe to open valve 73.

A pressure above a very considerably lower predetermined pressure, around 0.04 inch of water, will actuate the very-sensitive very-low pressure transducer and indicator gauge 71. If the pressure is not above this pressure within a predetermined time period which indicates leakage of the lock seam 15, the transducer and gauge 71 will not be actuated.

Assuming that the cartiridge 12 does leak, the reject cylinder control switch 91 is preconditioned to reject the filter cartridge 12 when it is lowered from the test head 11.

After the pressurization test is completed, valves 75 and 73 close, valve 78 opens to relieve the pressure within the cartridge 12 and valve 65 opens to vent the chamber 26. The excess air is then driven into the atmosphere through the silencing muffler 70. After the pressure is released, the solenoid valve 55 is actuated to reverse the direction of rotation of the hydraulic motor 51 and the shaft 29 is rotated in the opposite direction. This disengages the threaded portions 31 and 19. The expansible seal 25 is then deflated by opening the valve 63 to negative pressure. The valve 99 is then reversed causing the hydraulic cylinder 96 to be lowered and the clamping cylinder 92 is released. The valve 91 then actuates the reject cylinder 87 to force the filter cartridge 12 to a reject area.

If the filter cartridge 12 did not leak or have a bad thread, neither the pressure sensitive device 68 or the very sensisive very low pressure transducer and gauge 71 will precondition the valve 91 but rather the solenoid control valve 86 of the accept cylinder 83 is preconditioned. The filter cartridge 12 is then lowered from the test head in the manner previously described and the clamping cylinder 92 released. When the good cartridge 12 is lowered, the accept cylinder 83 is actuated by means of the solenoid valve 86 and the filter cartridge 12 is forced to a packaging area wherein a plurality of cartridges 12 may be suitably packaged for shipment.

It should be readily apparent that a relatively simple fully automated test apparatus is possible through the use of this invention. The unique expansible seal 25 is an important feature of the apparatus since it permits isolation of the lock seam 15 within a confined area wherein it may be tested for leakage. It is to be understood, of course, that the test head 11 could be utilized independently of the automatic controls for raising, lowering, clamping, accepting, rejecting the filter cartridges or any combination of them. In addition, the shaft 29 or any combination of them. In addition, the shaft 29 could be a fixed portion of the test head 11 and the cartridges 12 threaded upon it. Various other changes and modifications may be made without departing from the spirit and scope of the invention as defined by the appended claims.

What is claimed is:

1. The method of testing a throw-away type oil filter cartridge or the like having an end cap defining a fluid passage joined to and forming a closure from one end of a housing for leaks at the joint between the end cap and the housing closed at its other end by an integral end wall comprising the steps of sealing the end cap around the fluid passage and the housing around the joint to define a closed chamber containing the joint, pressurizing the interior of the container through the fluid passage, and sensing the pressure within the closed chamber.

2. The method of testing a throw-away type oil filter cartridge or the like having an end cap defining a fluid passage joined to a housing for leaks at the joint between the end cap and the housing compirsing the steps of inserting the housing past an expansible annular seal, sealing the end cap around the fluid passage, inflating the expansible seal to define a closed chamber containing the joint, pressurizing the interior of the container through the fluid passage, and sensing the pressure within the closed chamber.

3. The method of testing a throw-away type oil filter cartridge or the like having an end cap joined to a housing for leaks at the joint between the end cap and the housing and wherein the end cap has fluid inlet and fluid outlet passages formed therein, at least one of the fluid passages being defined in part by a threaded member, said method comprising the steps of threading the threaded member of the end cap onto the corresponding threaded member and forming a seal at the end cap around the fluid passages, sealing the housing around the joint to define a closed chamber between the seals containing the joint, pressurizing the interior of the container through at least some of the fluid passages, and sensing the pressure within the closed chamber.

4. The method of testing a throw-away type oil filter cartridge or the like having an end cap joined to a housing for leaks at the joint between the end cap and the housing wherein the end cap has a plurality of fluid inlet and fluid outlet passages therein, at least one of the passages being defined by a threaded member, said method comprising the steps of inserting the joint and housing past an expansible annular seal, threading the threaded member of the end cap onto a correpsonding threaded member and forming a seal around the fluid passages in the end cap, inflating the expansible seal to confine the joint in a closed chamber between the seals, pressurizing the interior of the container through at least a portion of the fluid passages, and sensing the pressure in the closed chamber.

5. A test apparatus comprising a head having an annular opering for receiving a jointed end of an oil filter cartridge or the like and having a female threaded opening in the end plate thereof, a stud supported by said head and extending concentrically into said annular opening, means for rotating said stud in opposite directions, an inflatable annular seal supported by the head at the base of the annular opening and adapted to sealingly engage the head and the cartridge when inflated to define a closed chamber containing the joint, means for pressurizing the cartridge or the like on the side of the joint opposite to said closed chamber, and means for sensing the pressure within said closed chamber.

6. The method of testing a throw-away type oil filter cartridge or the like having an end cap joined to a housing for leaks at the joint between the end cap and the housing and wherein the end cap has fluid inlet and fluid outlet passages formed therein, at least one of the fluid passages being defined in part by a threaded member, said method comprising the steps of threading the threaded member of the end cap onto a corresponding threaded member, sensing the torque exerted by the threading action, marking the cartridge if the threading torque exceeds a predetermined level to indicate a bad thread, forming a seal at the end cap around the fluid passages if the cartridge passes the threading test, sealing the housing around the joint to define a closed chamber between the seals containing the joint, pressurizing the interior of the container through at least some of the fluid passages, and sensing the pressure within the closed chamber.

7. The method of testing a throw-away type oil filter cartridge or the like having an end cap joined to a housing for leaks at the joint between the end cap and the housing, the end cap having a fluid outlet passage defined by a female threaded opening and a plurality of fluid inlet passages positioned around the threaded female opening, said method comprising the steps of threading the threaded female opening onto a male member, sensing the torque exerted by the threading action, marking the cartridge of the threading torque exceeds a predetermined level to indicate a bad thread, forming a seal at the end cap around the fluid outlet passages if the cartridge passes the threading test, sealing the housing around its periphery to confine the joint within a closed chamber, pressurizing the filter cartridge through at least one of the fluid passages, and sensing the pressure within the closed chamber.

8. The method of testing a throw-away type oil filter cartridge or the like having an end cap joined to a housing for leaks at the joint between the end cap and the housing wherein the end cap has a fluid outlet passage defined by a female threaded opening and a plurality of fluid inlet passages surrounding the threaded female opening comprising the steps of inserting the cartridge through an inflatable expansible annular seal until the joint passes the inflatable seal, threading the female opening onto a male threaded fastener by fixing the filter cartridge against rotation and by rotating the male threaded member, sensing the torque exerted by the threading action, marking the cartridge if the threading torque exceeds a predetermined level to indicate a bad thread, forming a seal around the fluid inlet openings in the end cap if the cartridge passes the threading test, inflating the expansible seal to confine the joint in a closed chamber between the seals, pressurizing the interior of the filter cartridge through at least one of the fluid openings in the end cap, and sensing the pressure within the closed chamber.

9. A test apparatus for pressure testing a jointed article comprising a test head, means in said test head defining a chamber adapted to receive the jointed portion of the article, pressure responsive seal means in said test head adapted to engage the article on one side of the joint for sealingly confining the joint within said chamber, means for applying fluid pressure to the jointed portion of the article on one side of the article, first pressure responsive means for indicating the pressure within said chamber, second pressure responsive means for indicating the pressure within said chamber, said second pressure responsive means being more sensitive than said first pressure responsive means for indicating a smaller pressure differential within said chamber than said first pressure responsive means, and means for precluding the operation of said second pressure responsive means if said first pressure responsive means indicates a pressure differential greater than the range of sensitivity of said second pressure responsive means.

10. A test apparatus for pressure testing a jointed article comprising a test head, means defining an annular chamber within said test head, an annular hollow inflatable seal supported by said test head adjacent said chamber, means for inflating the interior of said seal for urging said seal into sealing engagement with an article positioned in part in said chamber and for urging said seal into sealing engagement with said test head for confining a joint of the article within said chamber, a male threaded member supported by said test head and extending into said chamber for receiving a female threaded portion of the article to be tested, and fluid passage means extending through said male threaded member and opening through one end thereof for pressurizing the interior of the article to be tested.

References Cited
UNITED STATES PATENTS

| | | | |
|---|---|---|---|
| 1,706,567 | 3/1929 | Dezendorf | 73—40 |
| 2,564,198 | 8/1951 | Elkins | 73—155 |
| 2,873,764 | 2/1959 | Lombard et al. | 73—49.5 X |
| 3,135,575 | 6/1964 | Breidenbach et al. | 73—45.1 X |
| 2,334,303 | 11/1943 | Allen et al. | 73—46 |
| 2,761,311 | 9/1956 | Baker | 73—46 |
| 3,096,643 | 7/1963 | Essenmacker | 73—133 |

RICHARD C. QUEISSER, *Primary Examiner.*

J. W. MYRACLE, *Assistant Examiner.*